United States Patent [19]

Yamamoto et al.

[11] Patent Number: 4,876,139
[45] Date of Patent: Oct. 24, 1989

[54] FILM FOR PRINT LAMINATES AND THERMOCOMPRESSION BONDING PROCESS THEREFOR

[75] Inventors: Takeshi Yamamoto; Kunio Kondo; Hiroshi Yoshimura; Yoshihiro Wada; Fusazo Wada, all of Shiga, Japan

[73] Assignee: Gunze Kabushiki Kaisha, Kyoto, Japan

[21] Appl. No.: 143,135
[22] PCT Filed: Mar. 30, 1987
[86] PCT No.: PCT/JP87/00197
  § 371 Date: Oct. 30, 1987
  § 102(e) Date: Oct. 30, 1987
[87] PCT Pub. No.: WO87/06188
  PCT Pub. Date: Oct. 22, 1987

[30] Foreign Application Priority Data

Apr. 10, 1986 [JP] Japan .................. 61-83147

[51] Int. Cl.⁴ ............... B32B 3/00; B32B 5/16
[52] U.S. Cl. .................... 428/200; 428/204; 428/206; 428/207; 428/331; 428/346
[58] Field of Search ............. 428/200, 204, 206, 207, 428/331, 346

[56] References Cited

U.S. PATENT DOCUMENTS

| | | | |
|---|---|---|---|
| 3,995,295 | 5/1976 | Mayer | 428/204 X |
| 4,190,689 | 2/1980 | Fujita et al. | 428/206 X |
| 4,232,079 | 11/1980 | Raphael et al. | 428/323 X |
| 4,297,411 | 10/1981 | Weiner | 428/349 X |
| 4,333,968 | 6/1982 | Nahmias | 428/349 X |
| 4,348,457 | 9/1982 | Rosenthal et al. | 428/349 |
| 4,367,112 | 11/1983 | Park | 428/349 X |
| 4,522,887 | 6/1985 | Koebisu et al. | 428/461 |

FOREIGN PATENT DOCUMENTS

| | | | |
|---|---|---|---|
| 122495 | 8/1984 | European Pat. Off. | |
| 59-192565 | 8/1980 | Japan | 428/323 |
| 59-67233 | 5/1983 | Japan | 428/323 |

OTHER PUBLICATIONS

Japanese Publication SHO 60-135236.
Japanese Publication SHO 60-135237.
Japanese Publication SHO 60-36939.

Primary Examiner—George F. Lesmes
Assistant Examiner—Mitchell Katz
Attorney, Agent, or Firm—Sixbey, Friedman, Leedom & Ferguson

[57] ABSTRACT

A film for print laminates comprises a film substrate and a heat-sensitive adhesive resin layer made of polyethylene, a copolymer containing at least 70 wt % of ethylene or a mixture of polymers at least 70 wt. % in total ethylene content. The resin layer is surface-treated by corona discharge in a nitrogen gas atmosphere having an oxygen concentration of less than 20.9 vol. % and has incorporated therein 0.2 to 5 wt. % of a finely divided white material having a mean particle size of 0.2 to 20 microns. When laminated to a print such as printed paper, the film permits the print to retain its original finish and color free of changes despite the lamination.

10 Claims, 1 Drawing Sheet

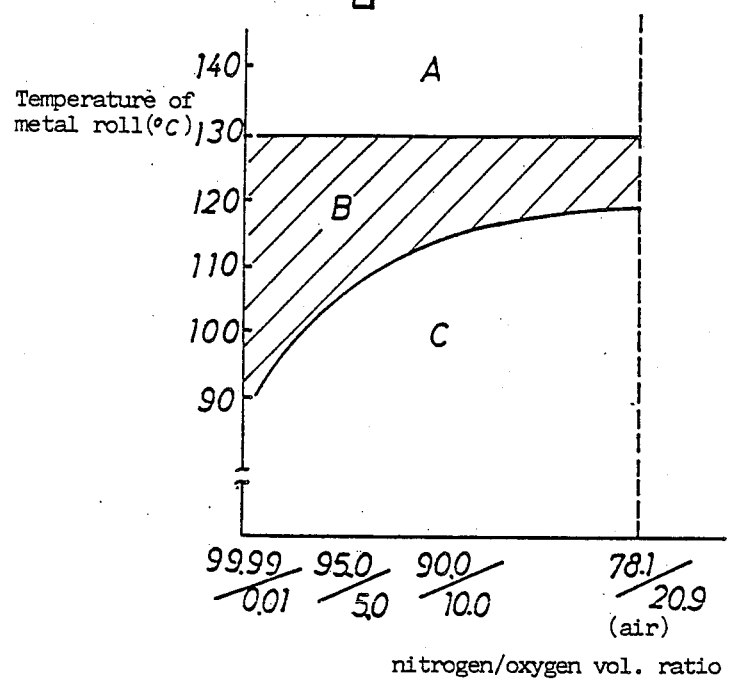
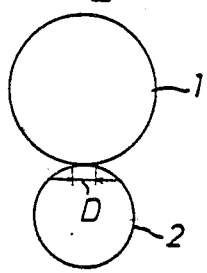

FILM FOR PRINT LAMINATES AND THERMOCOMPRESSION BONDING PROCESS THEREFOR

TECHNICAL FIELD

The present invention relates to a film for print laminates which is adapted to permit the print to retain its original color free of a change due to lamination, and to a process for laminating the film to a print such as printed paper by thermocompression bonding.

BACKGROUND ART

Paper containers, publications, cards, posters and other printed paper products include many of those having a plastic film laminated to the printed surface to protect the surface, render the surface resistant to water and oils or beautiful and for other purposes as well known. The article thus treated is generally termed a "print laminate" in the art. It is common practice to use a composite film comprising a film substrate and a heat-sensitive adhesive resin layer as a film for print laminates. Usually, the heat-sensitive adhesive resin layer of the film is bonded to a print such as printed paper by thermocompression to prepare a print laminate, i.e. the print covered with the film laminated thereto. The prior art concerned is disclosed in Unexamined Japanese Patent Publication No. SHO 59-24666, Examined Japanese Patent Publication No. SHO 60-36939, Unexamined Japanese Patent Publications Nos. SHO 60-135236 and SHO 60-135237, etc.

However, the print laminate products thus obtained have a drawback in that when a plastic film is laminated to printed paper or like print, the print color generally appears darker. Presumably, this is attributable to the following reason. The color printed on paper or the like before lamination appears slightly more whitish than the original color of the printing ink owing to the diffused reflection of light at the surface of the print, whereas no diffused reflection occurs when the plastic film is laminated to the print since the heat-sensitive adhesive resin layer bonds to the surface of the print intimately completely.

On the other hand, the printer is responsible for finishing the print in the color requested by the user. However, the color, even if printed as specified, appears different upon lamination, with the result that he fails to assume his responsibility. Accordingly, it has been strongly desired to prevent the color change of print laminate products due to lamination.

In view of the above problem, we have conducted extensive research and found that when a finely divided white material is provided at the interface between printed paper or like print and a film laminated thereto, diffused reflection occurs owing to spaces around fine particles, consequently preventing the color from appearing darker upon lamination to preclude the color change.

The object of the present invention, which has been accomplished based on the above finding, is to provide a film for print laminates and a thermocompression bonding process therefor which permit printed paper or like print to retain its original color free of any change despite lamination.

DISCLOSURE OF THE INVENTION

The present invention provides a film for print laminates which is bondable to a print by thermocompression and which comprises a film substrate and a heat-sensitive adhesive resin layer made of polyethylene, a copolymer containing at least 70 wt. % of ethylene or a mixture of polymers at least 70 wt. % in total ethylene content, the resin layer being surface-treated by corona discharge in a nitrogen gas atmosphere having an oxygen concentration of less than 20.9 vol. %, the film being characterized in that the heat-sensitive adhesive resin layer has incorporated therein 0.2 to 5 wt. % of a finely divided white material having a mean particle size of 0.2 to 20 microns. For the thermocompression bonding of the film to a print, the heat-sensitive adhesive resin layer is bonded to the print under the following conditions by bringing the film into contact with a metal heat roll and the print with a rubber pressure roll.

Thermocompression bonding conditions

Temperature of metal heat roll 80°–140° C.
Surface hardness of rubber pressure roll 85–95 deg
Bonding pressure (linear pressure) 60–90 kg/cm
Distance of contact between metal heat roll and rubber pressure roll 15–35 mm
Lamination speed 20–50 m/min When the film of the present invention is bonded to printed paper or like print by thermocompression under the above specified conditions, the print retains the original finish free of any change despite the lamination, whereby the drawback of the prior art can be overcome.

BRIEF DESCRIPTION OF THE DRAWINGS

FIG. 1 is a graph showing the results obtained when laminates comprising the film of the invention were tested for curl and bond strength; and FIG. 2 is a diagram showing thermocompression bonding rolls.

BEST MODE OF CARRYING OUT THE INVENTION

The present invention is practiced in the mode to be described below in detail.

Although the film substrate to be used in the invention is not limited specifically, it is preferably a biaxially stretched polypropylene film. Examples of such films are those made of a propylene homopolymer at least 90% in boiling n-heptane extraction residue content, a propylene-alpha-olefin copolymer up to 5 mole % in alpha-olefin content, a mixture of propylene homopolymer and propylene-alpha-olefin copolymer containing propylene in a total amount of at least 95 mole %, and a mixture of such polypropylene resin and waste film fragments resulting from the film forming process of the invention. Although the thickness of the film substrate is not limited specifically, it is desired that the thickness be usually 12 to 20 microns. The film substrate, e.g. biaxially stretched polypropylene film, to be used in the invention may of course be colored or contain a lubricant, antiblocking agent, stabilizer, ultraviolet absorber, antistatic agent, etc.

The heat-sensitive adhesive resin layer to be laminated to the film substrate, e.g. biaxially stretched polypropylene film, is a layer made of polyethylene, a copolymer containing at least 70 wt. % (preferably at least 85 wt. %) of ethylene, or a mixture of such polymers at least 70 wt. % (preferably 85 wt. %) in total ethylene content. The monomer to be copolymerized with ethylene is not limited specifically insofar as it is copolymerizable with ethylene. Examples of useful monomers are propylene, butene-1, hexene-1, vinyl acetate, acrylic acid ester, acrylic acid, etc. Also usable in this invention is such a copolymer as modified, for example, by cross-linking using a metal ion, or one graft-polymerized with maleic anhydride. However, if the resin is less than 70 wt. % in total ethylene content, waste film fragments resulting from the film forming process or slitting step are not reusable by recycling for the film substrate, e.g. polypropylene layer, hence undesirable from the viewpoint of savings in resources. If film fragments of such resin are used, the resulting film exhibit greatly impaired properties in respect of transparency, slipping property, dimensional stability and the like and is not usable as a biaxially stretched polypropylene film or the like.

Accordingly, the total ethylene content is preferably at least 70 wt. %, more preferably at least 85 wt. %. The heat-sensitive adhesive resin layer useful for the invention may of course contain a lubricant, antiblocking agent, stabilizer, coloring agent, ultraviolet absorber, antistatic agent and other resin in suitable amounts that will not seriously impair the lamination bond strength and like properties.

The finely divided white material to be incorporated into the heat-sensitive adhesive resin layer is 0.2 to 20 microns, preferably 1 to 10 microns, in mean particle size. Usually inorganic materials are desirable which include, for example, talc, silica, silica gel, titanium oxide, zinc oxide and the like. The term "white" as used herein of course includes perfect white, slightly colored white and colorless transparency. The finely divided white material is used to prevent the laminated print from appearing darker as already stated. When the heat-sensitive adhesive resin layer having the finely divided material incorporated therein is observed microscopically, some of the particles are found to be projected from the surface of the layer. When the film having the layer is laminated to printed paper or like print by thermocompression bonding, spaces which are microscopically observable are created around fine particles as already described, presumably causing diffused reflection of light and preventing the print from appearing darker as described above.

Incidentally, the finely divided white material, even if incorporated into the film substrate, is almost ineffective for inhibiting a change in whiteness, i.e. for inhibiting the printed color from appearing darker for the following reason. First, the finely divided white material, even if added to the film substrate, produces no effect when it is present in a small amount. If it is used in such a large amount as to achieve an appreciable effect, the material greatly impairs the transparency of the film to make the print appear obscure. Second, when a finely divided material, such as silica, which has a relatively high degree of transparency almost without a white appearance, is added to the heat-sensitive adhesive resin layer, the resulting layer exhibit little or no increase in its whiteness, whereas if a film having this layer is laminated to a print, the film effectively prevents the print from appearing darker. Briefly, it is only when the finely divided white material is incorporated into the heats-sensitive adhesive layer that the darkening preventing effect is available.

The amount of finely divided white material to be used is suitably variable in accordance with the kind of printing ink, the material and surface structure of the printed paper, the thickness of the resin layer and other factors. Generally, it is 0.2 to 5 wt. %, preferably 0.2 to 3 wt. %. The desired darkening preventing effect will not be achievable when the material is less than 0.2 micron in mean particle size, whereas if the size exceeds 20 microns, excessively large spaces will result to render the resulting print laminate unsightly, hence undesirable. On the other hand, the material fails to achieve a high darkening preventing effect when present in an amount of less than 0.2 wt. %. The content of the material, if exceeding 5 wt. %, impairs the transparency of the film, further making the print laminate unsightly. The heat-sensitive adhesive layer can be laminated to the film substrate by any known method. Preferably, the film for print laminates is prepared, for example, by extruding the resin for the film substrate into a sheet, roll-stretching the sheet 4 to 6 times longitudinally thereof at 120° to 140° C., subsequently extruding the heat-sensitive adhesive resin in a molten state onto the stretched sheet, and stretching the resulting laminate 7 to 12 times transversely thereof at 155° to 165° C. by a tenter, whereby a composite film, i.e. a print lamination film of the invention, can be obtained with the film substrate biaxially stretched. The present film may be prepared by any other known method. While the thickness of the heat-sensitive adhesive resin layer is determined suitably in accordance with the surface smoothness of the printed paper or like print to be laminated, the desired bond strength, etc., it is generally preferably 1 to 5 microns. Although the thickness can be more than 5 microns, larger thicknesses are unnecessary.

To render the heat-sensitive adhesive resin layer bondable to printed paper or like print by thermocompression, the layer is treated by corona discharge in a nitrogen atmosphere. This atmosphere is effective when having an oxygen concentration which is less than the oxygen concentration of air, i.e. 20.9 vol. %. The lower the concentration of oxygen remaining in the atmosphere, the greater is the effect. Preferably, the concentration is up to 5 vol. %. The intensity of corona discharge and the temperature of the film for the treatment are suitably determined. Usually, it is suitable that the intensity be 30 to 150 W·min/m$^2$, and that the temperature be room temperature to 90° C., preferably about 50° to 80° C. The nitrogen atmosphere can be provided by any known method, for example, by enclosing the corona discharge treating unit in its entirety with a box and replacing he interior air by nitrogen gas, or by applying nitrogen gas to the corona charger through a slit. The film thus obtained is then laminated to printed paper or like print by thermocompression bonding The process, apparatus and conditions for thermocompression bonding are not limited specifically but can be suitably determined. A preferred example of such thermocompression bonding process will be described next. The heat-sensitive adhesive resin layer of the film is laminated to the printed surface of printed paper or like print by thermocompression bonding using a pair of pinch rolls, i.e. a metal heat roll and a rubber pressure roll, that is, by bringing the film into contact with the heat roll and the print with the pressure roll. The bonding apparatus, the bonding conditions differ suitably depending on the quality of paper, lamination speed, etc. Generally, the temperature of the metal heat roll, i.e. the lamination temperature, is 80° to 140° C., preferably 90° to 130° C., although the proper temperature of course varies with the lamination speed. Higher temperatures result in marked curling and pose a problem in respect of durability of the rubber portion of the pressure roll, whereas lower temperatures entail insufficient lamination bond strength and reduced gloss. An example of metal heat roll is one having a mirror-finished roll surface (e.g. with hard chromium plating or the like). Examples of pressure rolls are those made of heat-resistant rubber, high-pressure rubber or the like and having surface hardness of 85 to 95 deg. If the rubber hardness (JIS A) is lower, the lamination bond strength and gloss will be impaired. Satisfactory bonding pressure is about 60 to about 90 kg/cm in terms of linear pressure. Lower pressures lead to lower lamination bond strength and lower gloss, whereas higher pressures pose a problem in respect of the durability of the pressure roll which is made of rubber. For the desired operation, the lamination speed is in the range of from 20 to 50 m/min. The suitable operation speed may vary depending on the quality of paper, the type of printing ink, etc. Higher speeds generally result in lower lamination bond strength, insufficient gloss, etc. With reference to FIG. 2, the distance of contact between the metal heat roll 1 and the rubber pressure roll 2 (indicated at D in the diagram showing the rolls in side elevation, can be referred to also as the width of contact) is about 15 to about 35 mm. If the contact distance is too small, the film will not be heated effectively, failing to exhibit high lamination strength and high gloss. The contact distance, which is dependent on the roll diameter and the rubber hardness and bonding pressure of the pressure roll, can not be easily increased by lowering the rubber hardness or increasing the bonding pressure as will be apparent from the above description, so that the roll diameter is usually increased for this purpose. Generally, it is most desirable to increase the diameter of the pressure roll, whereas the roll, if very large, is difficult to replace. In view of this, it is desirable that both the metal heat roll and the rubber pressure roll have the largest possible size. Although the preferred mode of practicing the invention has been described above in respect of the bonding apparatus, bonding conditions, etc., other conditions are usable for the invention. However, the conditions other than those specified are generally likely to entail curling, lower lamination bond strength, insufficient gloss and various other faults and are not suitable in many cases. In the thermocompression bonding process described above, the film is brought into contact with the metal roll to permit the heat of the metal roll to act on the film effectively and also to produce a beautiful laminate of enhanced bond strength irrespective of whether the metal heat roll is mirror-surfaced or otherwise finished. When it is desired to emboss the surface of the print laminate, i.e. of the film, an embossed metal roll is used for lamination in place of the mirror-finished metal roll described, whereby embossed print laminate is similarly prepared.

The present invention will be further described with reference to the following specific examples and comparative examples. Nevertheless, the invention is of course not limited to these examples.

EXAMPLE 1

A film (750 microns in thickness) of crystalline polypropylene extruded in a molten state was stretched longitudinally thereof 5 times at 130° C. by a roll stretching machine. Subsequently, an ethylene-vinyl acetate copolymer, 12 wt. % in vinyl acetate content and 12 in M.I., serving as a heat-sensitive adhesive resin layer and containing a specified amount of talc, 2 microns in mean particle size, was extruded in a molten state to a thickness of 30 microns onto the uniaxially stretched film. The laminate was then stretched transversely thereof 10 times at 160° C. to obtain a biaxially stretched composite polypropylene film.

The film was 18 microns in thickness, 3 microns in the thickness of the ethylene-vinyl acetate layer and 1 wt. % in talc content.

The surface of the ethylene-vinyl acetate copolymer layer of the composite film thus obtained was treated by corona discharge at an intensity of 60 W·min/m² at a film temperature of 60° C. in an atmosphere at varying nitrogen/oxygen ratios to obtain different samples of print lamination film according to the invention.

EXAMPLE 2

The film obtained in Example 1 and printed art paper serving as a print were passed between a metal heat roll mirror-finished by hard chromium plating and a pressure roll of hard heat-resistant rubber, with the heat-sensitive adhesive resin layer of the film placed on the printed surface of the art paper, and also with the film in contact with the heat roll and the art paper in contact with the pressure roll, whereby the film was bonded to the paper by thermocompression bonding to give a print laminate.

During the operation, the temperature of the metal heat roll was varied between 90° to 130° C. The rubber hardness of the pressure roll was 90 deg, the thermocompression bonding pressure was 80 kg/cm in terms of linear pressure, the distance of contact between the metal roll and the rubber roll was 25 mm, the lamination speed was 35 m/min, the diameter of the metal roll was 600 mm, and that of the rubber pressure roll was 350 mm.

The laminate product thus obtained exhibited the original printed color almost free of any change despite lamination and was very attractive in appearance.

COMPARATIVE EXAMPLE 1

Exactly the same procedure as in Example 1 was repeated except that the heat-sensitive adhesive resin layer of the film was 0.05 wt. % in talc content. The print laminate product obtained exhibited a color darker than the original color of the print as finished, hence a color change.

COMPARATIVE EXAMPLE 2

A print laminate product was obtained in the same manner as in Comparative Example 1 except that the talc content was 0. The product similarly exhibited a color change.

EXAMPLE 3

A print lamination film was prepared in the same manner as in Example 1 except that 2 wt. % of silica, 5 microns in mean particle size, was incorporated into the heat-sensitive adhesive resin layer in place of talc. A print laminate product was prepared by th same process as in Example 2 using the film. The product obtained exhibited little or no color change as in Example 2.

FIG. 1 shows the results obtained by checking the print laminate product obtained in Example 2 for curling and bond strength. In this drawing, the temperature of the metal roll (°C.) is plotted as ordinate vs. the nitrogen/oxygen vol. ratio as abscissa. Zone A represents curled samples, zone B satisfactory samples, and zone C samples with insufficient lamination bond strength. The bond strength was determined by peeling the film of the laminate product from its printed paper and checking the result. When the printed ink was entirely transferred onto the film or the printed paper was broken, the result was evaluated as indicating satisfactory bond strength. If the printed ink was transferred to the film only partially, the result was evaluated as indicating insufficient bond strength. The diagram shows the zones at a lamination speed of 35 m/min. When the lamination speed exceeds 35 m/min, the zones of course shift upward, whereas when the speed is lower than this value, the zones shift downward. The graph should be interpreted with this considered.

COMPARATIVE EXAMPLE 3

The composite film obtained in Example 1 before the corona discharge treatment was dipped in a potassium dichromate/concentrated sulfuric acid saturated solution for 3 seconds, then washed with water and thereafter dried in air. The film was subsequently bonded to printed paper by thermocompression using the same apparatus as in Example 2. When the laminate obtained was checked for curling and bond strength, the sample obtained at a metal heat roll temperature of 125° to 130° C. was found satisfactory. However, insufficient bond strength resulted when the temperature was lower than 125° C., or curling occurred when the temperature was above 130° C.

COMPARATIVE EXAMPLE 4

The composite film obtained in Example 1 before the corona discharge treatment and printed paper were subjected to thermocompression bonding process using the same apparatus as in Example 2. However, the film almost totally failed to bond to the print even at a metal heat roll temperature of 135° C.

The results achieved in Example 2 and Comparative Examples 3 and 4 indicate the following. First, Example 2 and Comparative Examples 3 and 4 reveal that the heat-sensitive adhesive resin layer, only when surface-treated, effectively bonds to the print. Example 2 and Comparative Example 3 show that the corona discharge treatment, when conducted in an atmosphere having a higher nitrogen/oxygen volume ratio than air, widens the range of suitable temperatures of the metal heat roll, assuring a facilitated lamination procedure.

INDUSTRIAL APPLICATION

The film of the invention for print laminates suited for use on paper containers, publications, cards, posters and other printed paper products to protect the surface, render the surface beautiful or resistant to water and oils and for other purposes. The thermocompression bonding process is useful for the film for print laminates.

We claim:

1. A film for print laminate use with absence of darkening or color change of a print upon lamination thereon, said film being bondable to a print by thermocompression and which comprises a film substrate and a heat-sensitive adhesive resin layer, said adhesive resin layer being chemically composed of polyethylene, an ethylene copolymer containing at least 70 wt. % of ethylene or a mixture of polymers at least 70 wt. % in total ethylene content, and being surface-treated by corona discharge in a nitrogen gas atmosphere having an oxygen concentration of less than 20.9 vol. %, wherein the improvement comprises the random incorporation of a finely divided white material into said adhesive resin layer in an amount of 0.2 to 3 wt. %, said finely divided white material having a mean particle size of 0.2 to 20 microns.

2. A film for print laminates as defined in claim 1 and characterized in that the finely divided white material is talc, silica, silica gel, titanium oxide or zinc oxide.

3. A film useful for forming a high quality color print laminate wherein the print color does not change or darken after thermocompression bonding of said film to a color print, said film comprising a film substrate supporting a layer of heat-sensitive adhesive resin surface treated by corona discharge in a nitrogen atmosphere having an oxygen concentration of less than 20.9 volume percent, wherein said heat-sensitive adhesive resin comprises a polymer selected from the group consisting of polyethylene, an ethylene copolymer containing at least 70 weight ethylene or a mixture of polymers containing at least 70 weight percent ethylene, and wherein said resin has randomly dispersed and incorporated therein in an amount of 0.2 to 5 weight percent a finely divided white material having a mean particle size of 0.2 to 20 microns.

4. A film as described in claim 3, wherein said film substrate comprises biaxially stretched polypropylene having a thickness of 12 to 20 microns.

5. A film as described in claim 4, wherein the thickness of said heat-sensitive adhesive resin layer is 1 to 5 microns.

6. A film as described in claim 5, wherein said film substrate and said resin layer further contain at least one agent selected from the group consisting of lubricants, antiblocking agents, stabilizers, ultraviolet absorbers, coloring agents and antistatic agents.

7. A film as described in claim 3, wherein said finely divided white material comprises a material selected from the group consisting of talc, silica, silica gel, titanium dioxide and zinc oxide.

8. A film as described in claim 7, wherein the mean particle size of said finely divided white material is 1 to 10 microns.

9. A film as described in claim 7, wherein 0.2 to 3 weight percent of said finely divided white material is randomly dispersed and incorporated into said resin layer.

10. A film as described in claim 3, wherein the polymer comprising said heat-sensitive adhesive resin contains at least 85 weight percent ethylene.

* * * * *